United States Patent
Kosta et al.

(10) Patent No.: US 7,549,795 B2
(45) Date of Patent: Jun. 23, 2009

(54) ANALOG THERMAL SENSOR ARRAY

(75) Inventors: Luria Kosta, Pardesia (IL); Joseph Shor, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 11/480,336

(22) Filed: Jun. 30, 2006

(65) Prior Publication Data

US 2008/0002757 A1 Jan. 3, 2008

(51) Int. Cl.
*G01K 7/01* (2006.01)
(52) U.S. Cl. .................. 374/170; 374/178; 702/130
(58) Field of Classification Search ......... 374/170–173, 374/178, 1, 100, 110, 112, 137, 29, 183, 374/185, 179, 163; 702/130, 131, 132, 133, 702/134, 135, 136, 139, 99; 327/512, 513
See application file for complete search history.

(56) References Cited

U.S. PATENT DOCUMENTS

| | | | | |
|---|---|---|---|---|
| 3,383,614 | A * | 5/1968 | Emmons et al. | 330/256 |
| 5,902,044 | A * | 5/1999 | Pricer et al. | 374/112 |
| 5,967,661 | A * | 10/1999 | Renken et al. | 374/126 |
| 6,164,816 | A * | 12/2000 | Aderhold et al. | 374/1 |
| 6,616,332 | B1 * | 9/2003 | Renken et al. | 374/162 |
| 6,668,230 | B2 * | 12/2003 | Mansky et al. | 506/39 |
| 6,695,475 | B2 * | 2/2004 | Yin | 374/171 |
| 6,786,639 | B2 * | 9/2004 | Covi et al. | 374/178 |
| 6,877,897 | B2 * | 4/2005 | Braun et al. | 374/178 |
| 6,879,928 | B2 * | 4/2005 | Clabes et al. | 702/130 |
| 7,071,723 | B2 * | 7/2006 | Krishnamoorthy et al. | 324/765 |
| 7,180,380 | B2 * | 2/2007 | Bienek et al. | 331/66 |
| 7,197,419 | B2 * | 3/2007 | Floyd et al. | 702/130 |
| 7,347,621 | B2 * | 3/2008 | Sri-Jayantha et al. | 374/166 |
| 2003/0055526 | A1 * | 3/2003 | Avanzino et al. | 700/164 |
| 2003/0158683 | A1 * | 8/2003 | Gauthier et al. | 702/99 |
| 2003/0158697 | A1 * | 8/2003 | Gold et al. | 702/132 |
| 2004/0190585 | A1 * | 9/2004 | Berndlmaier et al. | 374/1 |
| 2005/0114061 | A1 * | 5/2005 | Gauthier et al. | 702/99 |
| 2006/0057025 | A1 * | 3/2006 | Eversmann et al. | 422/82.02 |
| 2007/0081575 | A1 * | 4/2007 | Liu et al. | 374/111 |
| 2008/0215283 | A1 * | 9/2008 | Sri-Jayantha et al. | 702/130 |

OTHER PUBLICATIONS

Chen, Poki, et al., "A Time-To-Digital-Converter-Based CMOS Smart Temperature Sensor", *IEEE Journal of Solid-State Circuits*, vol. 40, No. 8, (Aug. 2005), pp. 1642-1648.

Szekely, Vladimir, et al., "CMOS Sensors For On-Line Thermal Monitoring Of VLSI Circuits", *IEEE Transactions on Very Large Scale Integration (VLSI) Systems*, vol. 5, No. 3, (Sep. 1997), pp. 270-276.

* cited by examiner

*Primary Examiner*—Gail Verbitsky
(74) *Attorney, Agent, or Firm*—Ryder IP Law; Douglas J. Ryder

(57) ABSTRACT

In general, in one aspect, the disclosure describes a localized IC thermal sensor. The thermal sensor includes an array of analog thermal sensors distributed across a circuit die to provide localized thermal measurements across the circuit die. The analog thermal sensors generate a frequency which is functionally dependent on temperature.

12 Claims, 3 Drawing Sheets

ANALOG THERMAL SENSOR ARRAY

BACKGROUND

Integrated circuits (ICs), such as microprocessors, continue to increase circuit densities to support higher levels of performance and functionality. The growth in transistor density has resulted in transistors having shorter gate lengths while power supply voltages have not been scaled proportionally. The increase in performance may include an increase in clock speeds and accordingly an increase in the power required to operate the ICs. The increase in power leads to increased temperature of the ICs. The temperature of the ICs needs to be maintained within certain parameters to ensure the IC does not malfunction or burn-out due to overheating. The temperature may be maintained by utilizing cooling systems (e.g., fans). The temperature of the IC should be monitored and the cooling system adjusted based on the temperature of the IC (e.g., air flow increases as the temperature increases). In addition, if the temperature gets to high the IC may be throttled down or off to bring the temperature down.

On chip temperature sensors may be used to monitor the temperature of the IC. Present thermal sensors include diode elements and inverter based oscillators. Diode thermal sensors require large areas and large current source arrays which make the sensor rather large. Oscillator thermal sensors are a strong function of the supply voltage and these voltages are very hard to calibrate in wafer and chip fabrication making this technique impractical for real time measurements.

Using a single thermal sensor measures the temperature of the IC at and near that particular point. The design of ICs may result in certain hot spots on the IC and there may be a fairly large thermal gradient across the die. Accordingly, it is desirable to position a thermal sensor near the hot-spots. However, it may be difficult to find room in the IC for diode thermal sensors. Moreover, the on-chip hot spots cannot be predicted accurately at the early stages of the design. The hot spots may only be known after the floor plan has been designated and there is a substantial amount of gate level real estate already on the die.

Accurate thermal monitoring of the IC, and in particular the hot spots on the IC, is needed to provide information for throttling and fan regulation.

BRIEF DESCRIPTION OF THE DRAWINGS

The features and advantages of the various embodiments will become apparent from the following detailed description in which.

DETAILED DESCRIPTION

Figure 1:
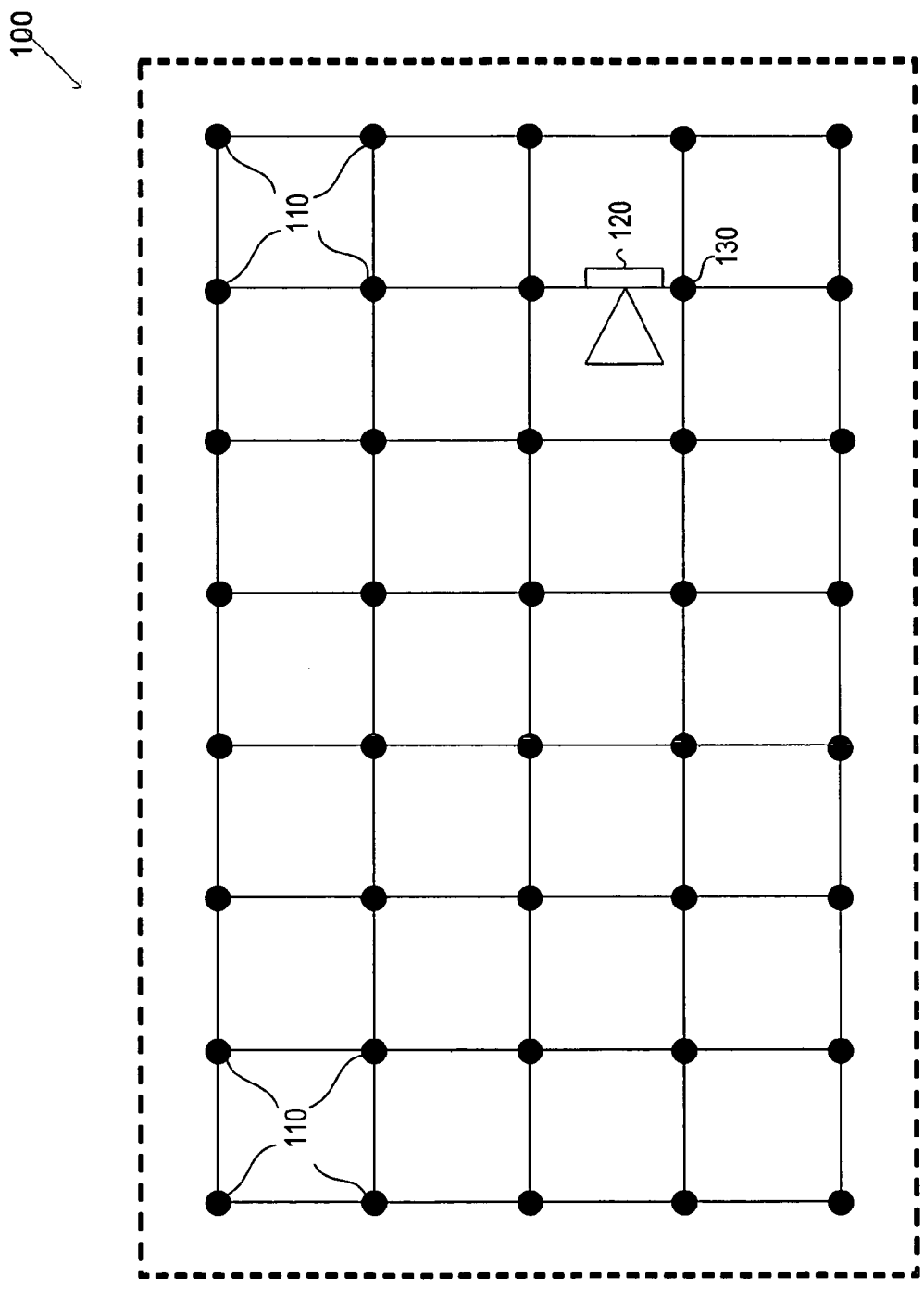
FIG. 1 illustrates an example localized IC thermal sensor, according to one embodiment.

FIG. 1 illustrates an example localized IC thermal sensor 100 that includes an array of miniature thermal sensors 110 on an IC die. The miniature sensors 110 may be small enough that they may be spread across the IC at defined intervals (e.g., at the vertices). The use of the array of miniature sensors 110 may provide true chip level thermal information (localized thermal measurements across the die) during processor operation without significant area or power penalty. The true chip level thermal information accordingly enables improved thermal management of the IC (e.g., activation of fans, throttling/activation of the IC). It should be noted that for ease of illustration the die circuitry is not included in FIG. 1.

The localized thermal sensor 100 may include a centralized thermal sensor 120 (e.g., thermal diode) that may give an absolute (or near absolute) temperature measurement of the IC at and around location of the centralized thermal sensor 120 on the IC. The miniature sensors 110 may be used to calculate a temperature difference ($\Delta T$) and determine relative temperature gradients across the IC. One of the miniature sensors 110 may be located near the centralized thermal sensor 120 to act as a reference sensor 130. The frequency of the reference sensor 130 may be compared to the frequency of other miniature sensors 110 to calculate a frequency difference ($\Delta f$) that can be used to calculate the $\Delta T$.

The localized thermal sensor 100 may have its own power grid (e.g., an on-chip regulated supply) for supplying power to the array of miniature sensors 110. The power grid may be very sparse since the miniature sensors 110 may require minimal current to operate. Moreover, the miniature sensors 110 may be turned on one at a time. The miniature sensors 110 may have a good power-supply rejection ratio (PSRR), so the DC variations and noise on the power grid ($V_{CC}$) and/or supply voltage ($V_{SS}$) should not affect the temperature measurement. A voltage regulator supplying the grid can be located in a convenient place (e.g., a phase lock loop (PLL) farm) where there may be reference circuits available.

Figure 2:
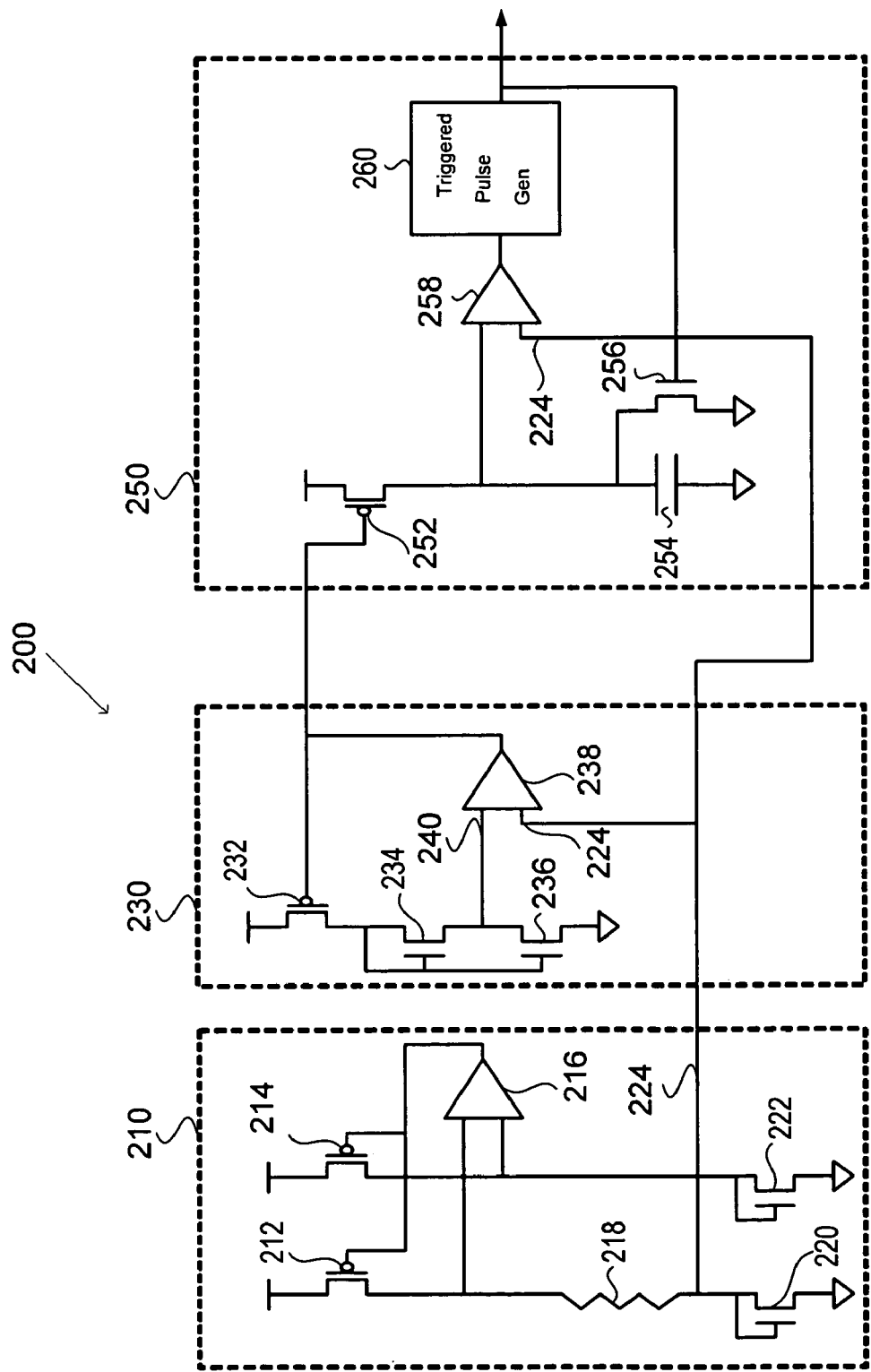
FIG. 2 illustrates an example circuit used as a miniaturized thermal sensor, according to one embodiment.

FIG. 2 illustrates an example circuit 200 that can be utilized as a miniaturized thermal sensor (e.g., 110 of FIG. 1). For convenience, hereinafter the circuit 200 will be referred to as thermal sensor 200. The thermal sensor 200 operates by converting temperature to current. The current is then used as the bias for a ring-oscillator. The overall effect is a sensor which converts temperature to frequency. The frequency may then be converted to a temperature.

The thermal sensor 200 utilizes analog circuitry (e.g., transistors) and the properties associated therewith to generate a temperature dependent frequency. The temperature dependent frequency is based on the temperature dependent properties of the analog circuitry (threshold voltage ($V_t$) and mobility (u)). Utilizing these properties results in a nearly linear or quasi linear relationship between frequency and temperature. The analog circuitry is designed with currents and voltages referenced to $V_{CC}$, so that there is negligible $V_{SS}$ dependence, hence a very good PSRR.

The miniaturized thermal sensor 200 may include a reference voltage generator 210, a current generator 230 and a current to frequency converter 250. The reference voltage generator 210 may be used to generate a reference voltage ($V_{ref}$), and the $V_{ref}$ may be linear with respect to temperature (e.g., proportional to absolute temperature (PTAT)). The current generator 230 may generate a reference current ($I_{ref}$) based on the $V_{ref}$. The current to frequency converter 250 may convert the $I_{ref}$ to a digital pulse train representing a frequency and the digital pulse train may be fed to a counter (not illustrated) to get a temperature reading.

The reference voltage generator 210 may include a first pair of parallel transistors (e.g., PMOS) 212, 214, an amplifier 216, a resistor 218, and a second pair of parallel transistors (e.g., NMOS) 220, 222. The amplifier 216 is connected to the transistors 212, 214 as input and provides feedback (e.g., a voltage) to the transistors 212, 214. The feedback is used to determine the current in the transistors 212, 214 and accordingly the current in the transistors 220, 222. The transistor 220 may be much larger than the transistor 222 so that the drain saturation voltage ($V_{dsat}$) of the transistor 222 may be roughly equal to the voltage drop across the resistor 218 and the $V_{dsat}$ of the transistor 220 may be very small (e.g., gate-source voltage ($V_{gs}$) of transistor 220 is approximately equal to it's threshold voltage ($V_t$)). Accordingly, an output ($V_{ref1}$) 224 of the reference voltage generator 210 may be approximately $V_t$, such that $V_{ref1}$~$V_t$. The $V_t$ is a linear function with respect to temperature so that the $V_{ref1}$ 224 generated may be linear with respect to temperature as well.

The current generator 230 may include a transistor (e.g., PMOS) 232, a transistor stack (two transistors (e.g., NMOS) 234, 236), and an amplifier 238. The amplifier 238 receives the $V_{ref1}$ 224 (from the reference voltage generator 210) and an output ($V_{ref2}$) 240 of the transistor stack 234, 236 as inputs and provides feedback (e.g., a voltage) to the transistor 232. The feedback is used by the transistor 232 to provide a current to the transistors 234, 236. The current is such that the $V_{ref2}$ 240 may be equal to the $V_{ref1}$ 224, such that $V_{ref2}$~$V_{ref1}$~$V_t$. The transistor 234 may be much larger than the transistor 236 so that most of the $V_{dsat}$ of the transistor stack 234, 236 is in the transistor 236, such that $V_{ref2}$~$V_{dsat}$.

As the inputs to the amplifier 238 may be of high impedance, the currents in transistors 232, 234, 236 may be substantially equal. The current (I) flowing through the transistor 236 may be determined based on the transductance (K') of the transistor 236 multiplied by the $V_{dsat}$ of the transistor 236 squared, such that I=K'*$(V_{dsat})^2$. Based on the configuration of the current generator 230 (e.g., amplifier feedback, size of transistors) the $V_{dsat}$ of transistor 236 may be equal to $V_t$, such that I=K'$V_t^2$. The transductance of the transistor is equal to the mobility (u) of the transistor times the gate oxide capaitance per unit area of the channel ($C_{ox}$(W/L)), such that K'=u $C_{ox}$(W/L). The mobility is the only parameter utilized in determining the transductance that is dependent on temperature and this dependence is nearly linear.

The current to frequency converter 250 may include a transistor (e.g., PMOS) 252, a capacitor 254, a transistor 256, an amplifier 258 and a triggered pulse generator 260. The feedback from the amplifier 238 of the current generator 230 is provided to the transistor 252. The current generated by the transistor 252 ($I_{ref}$) may be equal to or a multiple of the current generated by the transistor 232 such that $I_{ref}$=K'$V_t^2$. The $I_{ref}$ is used to charge the capacitor 254. The amplifier 258 receives the $V_{ref1}$ 224 and the charge stored in the capacitor 254 as inputs. When the capacitor 254 is charged to a value equal to the $V_{ref1}$, the amplifier 258 trips and triggers the triggered pulse generator 260 to generate a well-defined pulse. The pulse is feedback to the transistor 256 to discharge the capacitor 254.

The pulse is also fed into a counter (not illustrated) to measure the frequency. The frequency (f) will be determined by the transductance times the $V_t$ divided by the capacitance (C), such that f=K'$V_t$/C. Both K' and $V_t$ are temperature dependent parameters (in the same direction), hence the sensitivity of the circuit. The miniature temperature sensor 200 may be nearly linear because $V_t$ is a linear function with regard to temperature, while K' is 1/linear function. When the two functions are multiplied, the results are nearly linear.

Using analog circuitry and the transistor properties enables the thermal sensor 200 to be small enough that an array of them can be placed on the IC (see FIG. 1). This enables improved thermal management by enabling localized thermal measurements across the die, without area or power penalty, since the sensor is both small and consumes minimal current. Positioning the thermal sensors 200 in an array across the chip insures that there will be sensors 200 very close to the hot spots.

The thermal sensors 200 may be calibrated during wafer probing at low temperature (e.g., −25° C.) and during final chip test at high temperature (e.g., 110° C). Doing this enables the operating range and slope of the sensors to be calibrated. For example, if the operating range was from −20° C. to 100° C. and the frequency generated at the end points of the operating range was 70 MHz and 10 MHz respectfully, the slope for a linear relationship would be −0.5 MHz/1° C. (−60 MHz/120° C.). It may only be necessary to calibrate those sensors which are near hot-spots which are characterized at the end of the design or during testing.

The sensor may exhibit non-linearity in the middle of the temperature range (away from the calibration points). The non-linearity may be the greatest near the center of the range and decrease as it approaches the calibration points. The thermal sensor may generate a frequency that when used to generate a temperature based on a linear slope does not result in the actual temperature. For example, at 40° C. the frequency generated may be 35 MHz which would correspond to a temperature of 50° C. using the calibrated linear slope described above (a difference of 10° C. between the actual temperature and the temperature measured using the miniature sensor 200).

Referring back to FIG. 1, the non-linearity errors of the thermal sensors 110 may be addressed by determining the ΔT between a remote thermal sensor 110 (located near a hot spot) and the reference sensor 130 which is located near the centralized thermal sensor 120. It should be noted that the reference sensor 130 and the remote sensor 110 are the same type of sensors (e.g., miniature thermal sensor 200) and may exhibit similar non-linearity errors. It is assumed that the centralized thermal sensor 120 gives a very accurate temperature measurement. Utilizing the ΔT to generate a relative temperature reading at the remote sensors 110 causes the temperature error caused by the non-linearity of the sensors to be smaller over a smaller temperature range. The gradients across the IC will be much smaller than the total temperature range for which the thermal sensor operates. Thus when measuring the gradients between the remote thermal sensor 110 and the reference sensor 130, the percentage error, caused by non-linearity will be small compared to the non-linearity error between the calibration points mentioned earlier.

The non-linearity error will be small when the temperature is close to the calibration point, and larger when the temperature is further away from the calibration temperature. Thus, according to one embodiment, in order to prevent the error in ΔT from corrupting the temperature readings provided for the remote sensors 110 the output of the remote sensors 110 may be controlled between the relative temperature and the measured temperature. For example, at temperatures near the calibration points (e.g., −25 to 25° C., 75 to 110° C.) the absolute frequency/temperature reading of the remote sensor 110 may be used, while in the middle of the temperature range (e.g., 25-75° C.), the relative reading may be utilized. The central thermal diode/sensor 120 may be used to control whether the absolute or relative temperature measurement is used.

According to one embodiment, the thermal sensors 110 are characterized as a monotonic (albeit non-linear) curve between direct temperature and frequency. The frequency generated by the sensors 110 is converted to a temperature based on this monotonic curve. Accordingly, no further corrections would need to be made to account for non-linearities. The central thermal diode/sensor 120 may not be required in this embodiment.

The localized IC thermal sensor (analog thermal sensor array) may be used in any type of IC to monitor temperature of the IC at hot spots. The analog thermal sensor array may be utilized in computer systems. The computer systems may include one or more processors (ICs) to operate the device. The processors may have a single core or multiple cores. The processors may include on die memory, may utilize off die memory, or some combination thereof. The analog thermal sensor array may be used to monitor the temperature of any ICs in the system to ensure the ICs are operated within an appropriate temperature range.

Figure 3:
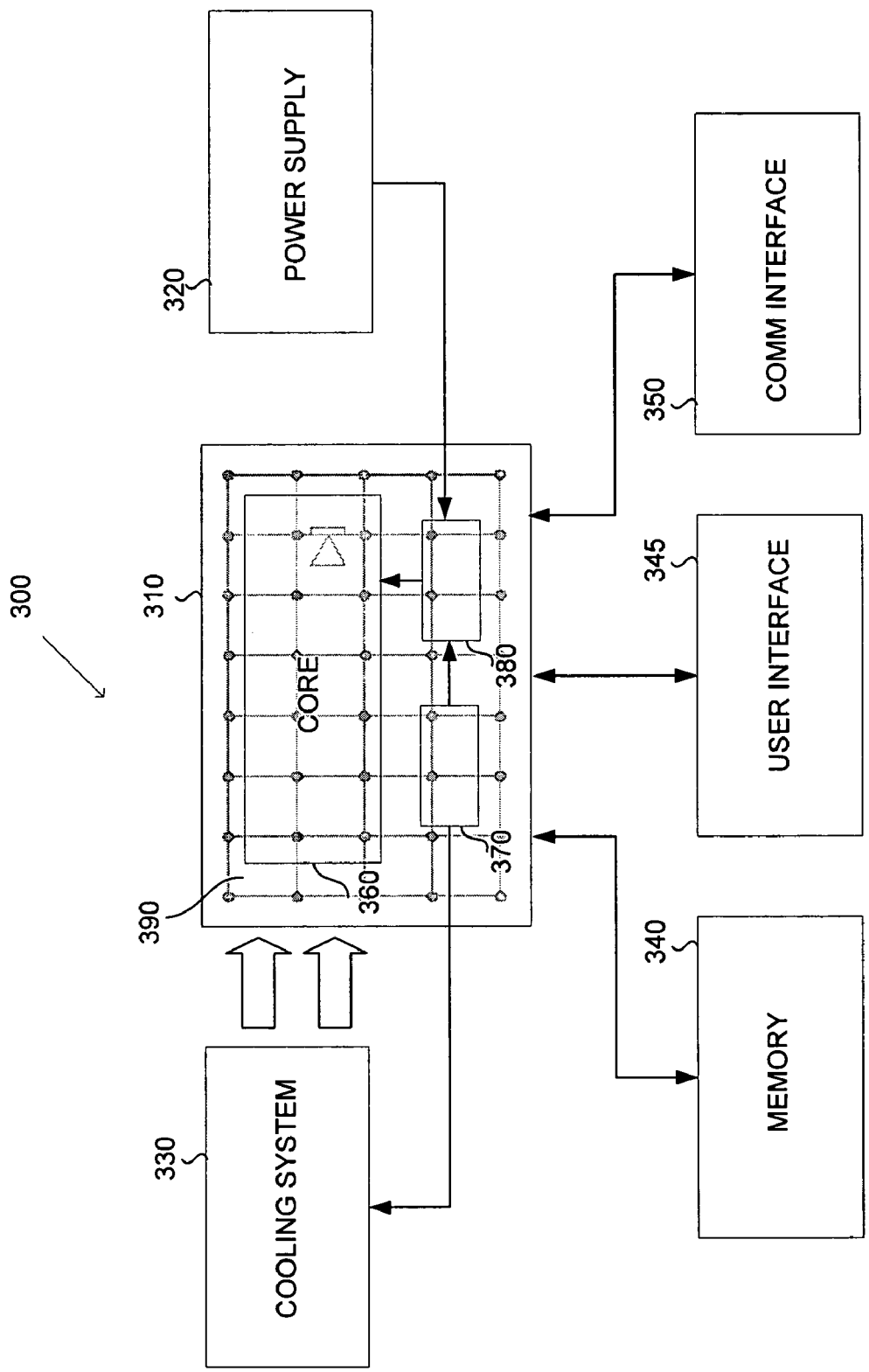
FIG. 3 illustrates a functional diagram of an example system utilizing an example localized IC thermal sensor, according to one embodiment.

FIG. 3 illustrates an example functional diagram of a system 300 utilizing a localized IC thermal sensor (e.g., 100). The system 300 includes a processor (IC) 310 to perform operations, a power supply 320 to provide power to the processor 310, a cooling system 330, memory 340, a user interface 345 and a communications interface 350. The processor 310 may include active circuitry 360 (core), temperature control circuitry 370 and power throttle circuitry 380. The temperature control circuitry 370 may determine the temperature of the IC 310 at various points (e.g., hot spots) utilizing an analog thermal sensor array 390 (illustrated in the background). The temperature control circuitry 370 may control activation of the cooling system 330 and the power throttling circuitry 340 based on the analog thermal sensor array 390.

It should be noted that the circuit 200 disclosed in FIG. 2 has been described with respect to being utilized as a miniaturized thermal sensor (e.g., 110), wherein an array of the miniaturized thermal sensors 110 make up a localized IC thermal sensor (e.g., 100). However, the circuit is not limited to being used as a thermal sensor, being implemented in an array, or being utilized at the IC level to provide a localized IC thermal sensor. Rather, the circuit could be used to measure other parameters could be implemented as a stand alone, and could be utilized at a board or system level without departing from the scope.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily all referring to the same embodiment.

Different implementations may feature different combinations of hardware, firmware, and/or software. It may be possible to implement, for example, some or all components of various embodiments in software and/or firmware as well as hardware, as known in the art. Embodiments may be implemented in numerous types of hardware, software and firmware known in the art, for example, integrated circuits, including ASICs and other types known in the art, printed circuit broads, components, etc.

The various embodiments are intended to be protected broadly within the spirit and scope of the appended claims.

What is claimed:

1. A localized IC thermal sensor comprising an array of analog thermal sensors distributed across a circuit die to provide localized thermal measurements across the circuit die, wherein the analog thermal sensors are to generate a digital pulse train representing a frequency which is functionally dependent on temperature, wherein each analog thermal sensor of the array of analog thermal sensors include
    a reference voltage generator to generate a reference voltage;
    a current generator to generate a reference current; and
    a current to frequency converter to convert the reference current to the digital pulse train representing the frequency.

2. The thermal sensor of claim 1, where the frequency has a quasi-linear dependence on temperature.

3. The thermal sensor of claim 1, wherein the frequency is based on threshold voltage.

4. The thermal sensor of claim 2, wherein the array of thermal sensors have a separate power grid.

5. The thermal sensor of claim 1, further comprising a centralized thermal sensor to provide a near absolute temperature measurement for the circuit die at and around location of the centralized thermal sensor on the circuit die.

6. The thermal sensor of claim 5, wherein the centralized thermal sensor is a thermal diode.

7. The thermal sensor of claim 5, wherein the array of analog thermal sensors provide measurements of thermal gradients from the near absolute temperature.

8. The thermal sensor of claim 5, wherein one of the array of analog thermal sensors located in close proximity to the centralized thermal sensor acts as a reference sensor for non-linearity corrections.

9. The thermal sensor of claim 1, wherein the reference voltage is substantially equal to threshold voltage ($V_t$).

10. The thermal sensor of claim 1, where the reference current is functionally dependent on the reference voltage.

11. The thermal sensor of claim 1, where the current generator includes a transistor and the current generator generates the reference current to cause a drain saturation voltage ($V_{dsat}$) of a transistor to be equal to the reference voltage.

12. The thermal sensor of claim 1, wherein the digital pulse train is fed to a counter to generate the frequency.

\* \* \* \* \*